(12) United States Patent
Chae et al.

(10) Patent No.: US 8,419,200 B2
(45) Date of Patent: Apr. 16, 2013

(54) BACKLIGHT UNIT AND LIQUID CRYSTAL DISPLAY DEVICE BOTH HAVING A POLARIZATION LAYER WITH PROTRUSIONS AND GROOVES

(75) Inventors: Gee Sung Chae, Incheon-si (KR); Jin Wuk Kimq, Uiwang-si (KR)

(73) Assignee: LG Display Co., Ltd., Seoul (KR)

( * ) Notice: Subject to any disclaimer, the term of this patent is extended or adjusted under 35 U.S.C. 154(b) by 117 days.

(21) Appl. No.: 11/472,635

(22) Filed: Jun. 22, 2006

(65) Prior Publication Data

US 2006/0291182 A1 Dec. 28, 2006

(30) Foreign Application Priority Data

Jun. 24, 2005 (KR) .................. 10-2005-0055199

(51) Int. Cl.
*F21V 9/14* (2006.01)
(52) U.S. Cl.
USPC ............. 362/19; 362/606; 362/607; 362/618
(58) Field of Classification Search .................... 362/19, 362/606, 617–619; 349/115
See application file for complete search history.

(56) References Cited

U.S. PATENT DOCUMENTS

| | | | | |
|---|---|---|---|---|
| 5,828,488 A * | 10/1998 | Ouderkirk et al. | ............ | 359/487 |
| 6,764,182 B2 * | 7/2004 | Ito et al. | ............ | 353/20 |
| 6,906,761 B2 * | 6/2005 | Nakano | ............ | 349/65 |
| 2003/0058386 A1 * | 3/2003 | Bastiaansen et al. | ......... | 349/100 |
| 2004/0080926 A1 * | 4/2004 | Chen et al. | ............ | 362/31 |
| 2004/0109303 A1 * | 6/2004 | Olczak | ............ | 362/19 |
| 2005/0059766 A1 * | 3/2005 | Jones et al. | ............ | 524/431 |
| 2005/0225695 A1 * | 10/2005 | Arai et al. | ............ | 349/74 |
| 2005/0265022 A1 * | 12/2005 | Kuo | ............ | 362/227 |
| 2005/0288469 A1 * | 12/2005 | Higuchi et al. | ............ | 526/319 |
| 2006/0262250 A1 * | 11/2006 | Hobbs | ............ | 349/96 |

FOREIGN PATENT DOCUMENTS

| | | |
|---|---|---|
| JP | 2003-207646 | 7/2003 |
| JP | 2004133208 A * | 4/2004 |
| KR | 10-2004-0106982 A | 12/2004 |

OTHER PUBLICATIONS

Office Action issued in corresponding Korean Patent Application No. 10-2005-0055199, mailed Dec. 19, 2011.

* cited by examiner

*Primary Examiner* — Robert May
(74) *Attorney, Agent, or Firm* — Brinks Hofer Gilson & Lione

(57) ABSTRACT

A backlight unit includes a light guide plate, at least one lamp provided at one or both sides of the light guide plate, a lamp housing surrounding the lamp, a lamp reflection plate positioned under the light guide plate to reflect light emitted from the lamp towards the light guide plate, and a polarization layer on an upper surface of the light guide plate and having an embossed pattern of protrusions and grooves on an upper surface thereof. A method for forming the backlight unit and a liquid crystal display device comprising the same are also disclosed.

5 Claims, 4 Drawing Sheets

BACKLIGHT UNIT AND LIQUID CRYSTAL DISPLAY DEVICE BOTH HAVING A POLARIZATION LAYER WITH PROTRUSIONS AND GROOVES

This application claims the benefit of Korean Patent Application No. P2005-55199, filed on Jun. 24, 2005, which is hereby incorporated by reference as if fully set forth herein.

BACKGROUND

1. Technical Field

The present invention relates to a backlight unit, and more particularly, to a backlight unit having a polarization layer attached to an upper surface thereof, a method for manufacturing the same, and a liquid crystal display device comprising the same.

2. Discussion of the Related Art

Advances in information technology result in rapidly increasing demands for display devices having various shapes. Correspondingly, various flat panel display devices, such as liquid crystal display (LCD) devices, plasma display panels (PDPs), electro luminescent display (ELD) devices, vacuum fluorescent display (VFD) devices, and the like, have been continuously investigated, and some of them have been already applied to various apparatuses in practice.

Among these flat panel display devices, the LCD devices are most widely used for a mobile image display device in place of CRT monitors in view of their merits including excellent image quality, light weight, compactness, and low power consumption. Specifically, the LCD devices are developed for monitors of TV sets which can receive and display broadcasting signals, and monitors of computers in addition to mobile display devices such as notebook computers.

In this regard, although various technological developments have been accomplished to enable the LCD devices to act as a screen display device in various fields, the LCD devices still have many problems in operation for improving the quality of an image as the screen display device, which result in failure to obtain the merits of the LCD device as mentioned above.

Accordingly, in order to allow the LCD devices to be applied to various apparatuses as a general screen display device, it is necessary for the LCD devices to realize high quality images with characteristics such as high definition, high brightness, large size while maintaining the merits such as light weight, compactness, and low power consumption.

A conventional liquid crystal display device will be described as follows.

FIG. 1 is a schematic view illustrating a conventional liquid crystal display device.

Generally, the LCD device comprises a liquid crystal panel to display an image, and a driving unit to drive the liquid crystal panel.

In the conventional LCD device, the liquid crystal panel denoted by reference numeral 1 comprises a liquid crystal cell 11, upper and lower polarization plates 12 and 13, and a backlight unit 10 to illuminate light to the liquid crystal panel 1, as shown in FIG. 1.

Although not shown in the drawings, the liquid crystal cell 11 comprises upper and lower substrates assembled to each other with a predetermined space defined therebetween, a liquid crystal layer formed between the upper and lower substrates, and a spacer to maintain a uniform cell gap in the liquid crystal layer. The upper and lower polarization plates 12 and 13 are coated on outer surfaces of the upper and lower substrates.

The driving unit comprises the backlight unit 10 to uniformly illuminate light to the liquid crystal panel, and driving circuits (not shown) to apply driving signals to the liquid crystal panel.

The backlight unit 10 comprises a lamp 15 provided at one side of a light guide plate 14, a lamp housing 17 surrounding the lamp 15 to protect the lamp 15, the light guide plate 14 to guide light emitted from the lamp 15 to be uniformly transmitted to the liquid crystal panel 1, a light scattering assembly 16 disposed on the light guide plate 14 to allow the light emitted upwardly through the light guide plate 14 to be uniformly transmitted to the liquid crystal panel 1, and a protective sheet 18 disposed on the light scattering assembly 16. The light scattering assembly 16 comprises a plurality of diffusion sheets, and horizontal and vertical prism sheets.

The upper and lower polarization plates 12 and 13 are respectively coated on the outer surfaces of the upper and lower substrates in a direction that transmission axes (absorption axes) thereof cross each other.

Generally, light is an electromagnetic wave, and has a vibration direction perpendicular to a direction of propagation. Polarized light is light biased in the vibration direction of light. That is, the polarized light means light which strongly vibrates in a specific direction among perpendicular directions with respect to the direction of propagation.

A polarization plate splits an incident light into two orthogonal polarization components, and allows only one of them to pass therethrough while absorbing or dispersing the other.

The backlight unit 10 emits light which vibrates with equal probability in all directions. The upper and lower polarization plates 12 and 13 allow only a component of light vibrating in the same direction as that of the polarization axis to be transmitted therethrough while absorbing or reflecting other components of light vibrating in other directions via a suitable medium, thereby providing light which vibrates only in a single specific direction.

Since the upper and lower polarization plates 12 and 13 are attached to upper and lower surfaces of the liquid crystal layer to be orthogonal or parallel to each other, it is possible to exhibit black, white and grey therebetween by regulating the intensity of transmitted light according to a rotating degree of the polarization axis, while light passes through the liquid crystal layer.

As such, the conventional LCD device displays an image by regulating light with the liquid crystal layer having a thickness of several micrometers between the upper and lower substrates, and the upper and lower polarization plates provided on the outer surfaces of the upper and lower substrates. For reference, a reflection type LCD device employs an external light source instead of the backlight unit, and displays an image by regulating light with the liquid crystal layer, a single polarization plate, and a single reflection plate.

In order to regulate light as described above, the liquid crystal display device displays the image by converting non-polarized light entering from the backlight unit or an external light source into polarized light, and controlling the polarized light using properties of the liquid crystal layer to regulate the intensity of emitted light.

For the conventional LCD device constructed as described above, the upper and lower polarization plates 12 and 13 are separately manufactured, and attached to the upper and lower portions of the liquid crystal cell 11. However, the conventional LCD device has problems in that, when attaching the separately manufactured polarization plates, there is possibility of defective assembly, and that it is inconvenient to separately manufacture the polarization plates.

SUMMARY

Accordingly, the present invention is directed to a backlight unit, a method for manufacturing the same, and a liquid crystal display device comprising the same that substantially obviate one or more problems due to limitations and disadvantages of the related art.

In accordance with one aspect of the invention, there is provided a backlight unit, including a light guide plate, at least one lamp provided at one or both sides of the light guide plate, a lamp reflection plate positioned under the light guide plate to reflect light emitted from the lamp towards the light guide plate; and a polarization layer on an upper surface of the light guide plate and having an embossed pattern of protrusions and grooves on an upper surface thereof.

In accordance with another aspect of the present invention, there is provided a backlight unit including a surface emission lamp and a polarization layer on an upper surface of the surface emission lamp and having an embossed pattern of protrusions and grooves on the upper surface thereof.

In accordance with yet another aspect of the present invention, there is provided a method for manufacturing a backlight unit that includes applying a liquid polymeric precursor to an upper surface of a light guide plate. A soft mold having a predetermined pattern of protrusions and grooves is provided and brought into contact with the liquid polymeric precursor to form an embossed pattern of protrusions and grooves on the liquid polymeric precursor. The liquid polymeric precursor is cured to form a cured polarization layer having the embossed pattern and the soft mold is stripped from the cured polarization layer.

In accordance with yet another aspect of the present invention, there is provided a liquid crystal display device including a liquid crystal panel having an upper polarization plate on an upper surface of the liquid crystal panel. A backlight unit resides below the liquid crystal panel. The backlight unit has a polarization layer with an embossed pattern of protrusions and grooves formed thereon.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
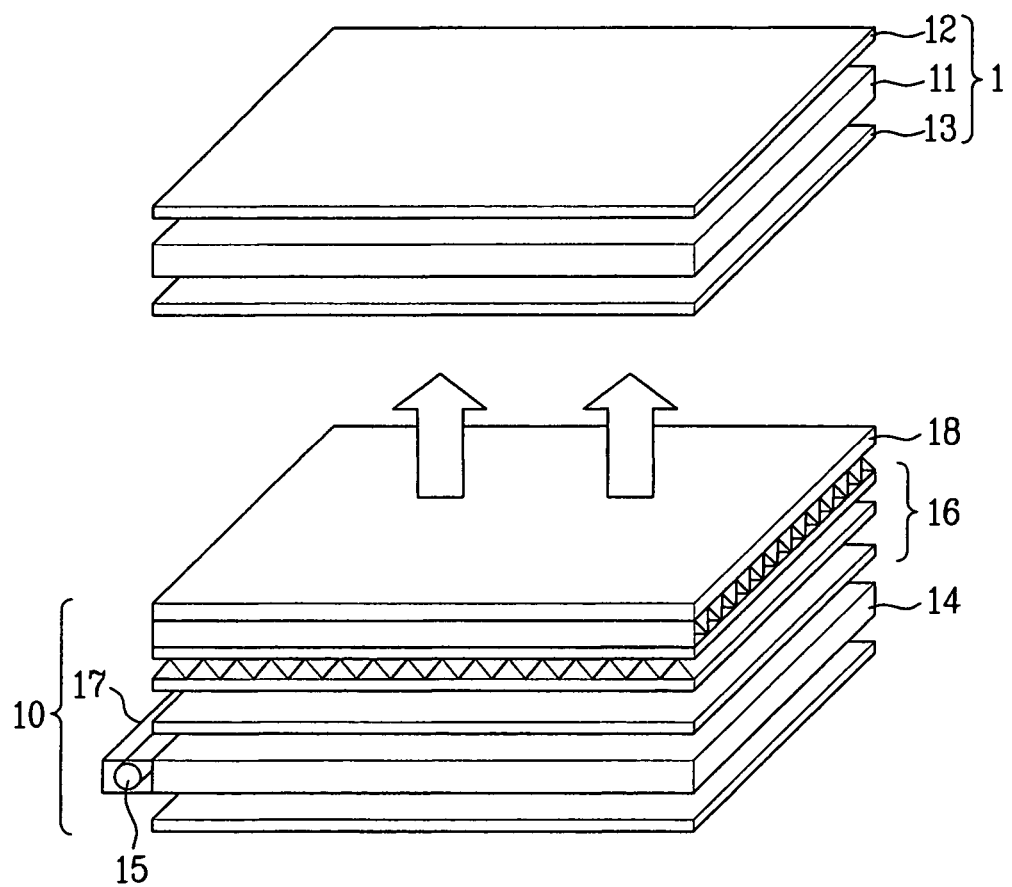
FIG. 1 is a schematic constructional view illustrating a conventional liquid crystal display device.
Figure 2:
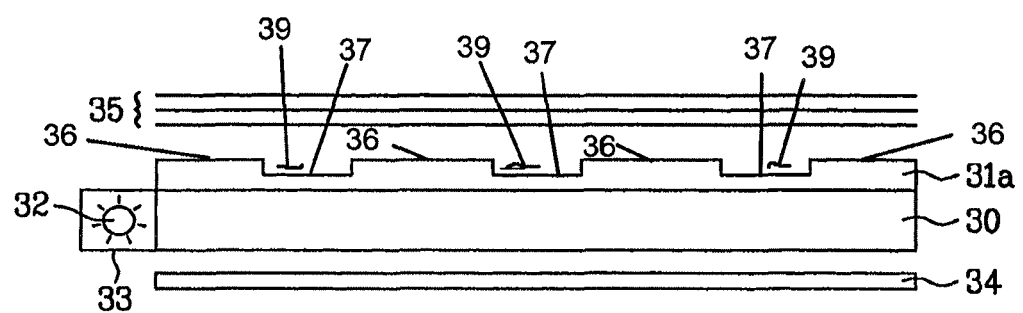
FIG. 2 is a cross-sectional view illustrating a backlight unit in accordance with an embodiment of the present invention.
Figure 4:
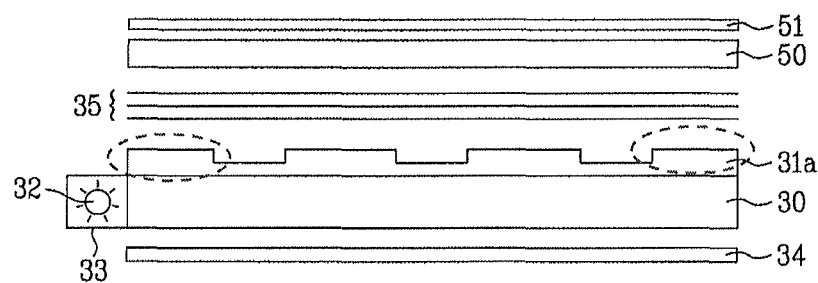
FIG. 4 is a cross-sectional view illustrating a liquid crystal display device in accordance with an embodiment of the present invention.

FIG. 2 is a cross-sectional view illustrating a backlight unit according to one embodiment, and FIG. 4 is a cross-sectional view illustrating a liquid crystal display device including the backlight unit of the illustrated embodiment of the present invention.

Referring to FIG. 2, the backlight unit of the illustrated embodiment includes a light guide plate 30; at least one lamp 32 positioned at one side of the light guide plate 30; a lamp housing 33 surrounding the lamp 32 to protect the lamp 32; a lamp reflection plate 34 positioned under the light guide plate 30 to reflect light emitted from the lamp 32 towards the light guide plate 30; a polarization layer 31a on an upper surface of the light guide plate 30 and having an embossed pattern of protrusions and grooves formed on an upper surface thereof; and a light scattering assembly 35 disposed on the polarization layer 31a.

The backlight unit may include two lamps 32 positioned at both sides of the light guide plate 30. The lamp 32 may be a single unidirectional fluorescent lamp, or a lamp assembly having multiple R, G and B light emitting diodes sequentially arranged in one direction.

The light scattering assembly 35 includes a plurality of diffusion sheets, and horizontal and vertical prism sheets.

Although an edge-type backlight unit has been described above as an example, in an alternative embodiment, the backlight unit can include a surface emission lamp including a light emitting diode or a white electro luminescent diode. In this case, the surface light emitting lamp has a polarization layer with an embossed pattern of protrusions and grooves formed thereon.

Next, referring to FIG. 4, the liquid crystal display device of the present embodiment includes a liquid crystal panel 50, an upper polarization plate 51 overlies an upper surface of the liquid crystal panel 50, and the backlight unit positioned below the liquid crystal panel 50 and having a polarization layer 31a with an embossed pattern of protrusions and grooves formed thereon.

The backlight unit may be an edge type backlight unit in which one or two lamps are provided at one or both sides of the backlight unit below the liquid crystal panel 50, or may be a surface emission lamp unit.

Where the backlight unit is an edge type backlight unit, the LCD device includes a light guide plate 30; at least one lamp 32 positioned at one side of the light guide plate 30; a lamp housing 33 surrounding the lamp 32 to protect the lamp 32; a lamp reflection plate 34 positioned under the light guide plate 30 to reflect light emitted from the lamp 32 towards the light guide plate 30; a polarization layer 31a attached to an upper surface of the light guide plate 30 and having an embossed pattern of protrusions 36 and grooves 37 formed on an upper surface thereof; and a light scattering assembly 35 disposed directly on the polarization layer 31a. As shown in FIG. 2, a plurality of discrete gaps 39 are formed between the polarization layer 31a and the light scattering assembly 35. The discrete gaps 39 are defined by the grooves 37 and the light scattering assembly 35 when the light scattering assembly 35 is assembled to and directly disposed on the polarization layer 31a.

In an alternative embodiment, the backlight unit includes two lamps 32 positioned at both sides of the light guide plate 30. The lamp 32 may be a single unidirectional fluorescent lamp, or a lamp assembly having multiple R, G and B light emitting diodes sequentially arranged in one direction.

The light scattering assembly 35 includes a plurality of diffusion sheets, and horizontal and vertical prism sheets.

Although the edge-type backlight unit has been described above as an example, in another alternative embodiment, the backlight unit is a surface emission lamp including a light emitting diode or a white electro luminescent diode. In this case, the surface light emitting lamp has a polarization layer with the embossed pattern of protrusions and grooves thereon.

Although not shown in FIG. 4, as known to those skilled in the art, the LCD device further includes a lower substrate (TFT array substrate) which is formed with a plurality of gate lines arranged at uniform intervals in one direction, a plurality of data lines arranged at uniform intervals in another direction perpendicular to the gate lines, a plurality of pixel electrodes, each being formed in a matrix shape in each of pixel regions defined by the data lines and the gate lines crossing each other, and a plurality of thin film transistors acting as switching elements via signals from the plural pixel electrodes and the gate lines to transmit a signal from the data lines to the respective pixel electrodes.

The LCD device further includes an upper substrate (color filter substrate) which is formed with a black matrix layer to shield light from a portion excluding a pixel region, a color filter layer of R, G and B to exhibit color images, and a common electrode to realize the images. In an in-plane switching mode LCD device, the common electrode is formed on the lower substrate.

The common electrode and the pixel electrode respectively formed on the upper and lower substrates are transparent electrodes having electrical conductivity, and are formed of a transparent material, for example, indium tin oxide (ITO), having relatively high light transmittance.

Next, a method for manufacturing a backlight unit constructed as described above according to an embodiment of the present invention will be described hereinafter.

FIGS. 3A to 3D are cross-sectional views illustrating manufacturing steps of the backlight unit according to the embodiment of the present invention.

In the method for manufacturing the backlight unit according to an embodiment of the present invention, a light guide plate or a surface emission lamp of the backlight unit is formed thereon with a polarization layer having an embossed pattern formed on an upper surface thereof.

Figure 3A:
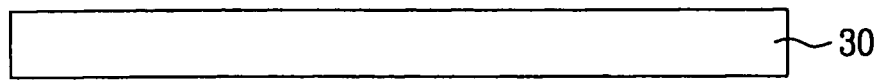
FIGS. 3A to 3C are cross-sectional views illustrating manufacturing steps of a backlight unit in accordance with one embodiment of the present invention.

First, referring to FIG. 3A, a light guide plate 30 is prepared, which serves to guide light emitted from a lamp 32 (see FIG. 2) to be uniformly transmitted above the light guide plate 30.

Figure 3B:
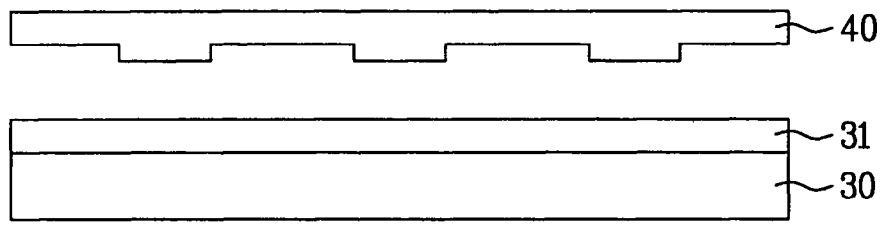

Then, as shown in FIG. 3B, a liquid polymeric precursor 31 is applied to an upper surface of the light guide plate 30.

Next, a soft mold 40 having a predetermined pattern of protrusions and grooves formed thereon is positioned on the upper surface of the light guide plate 30 to which the liquid polymeric precursor 31 is applied.

The liquid polymeric precursor 31 preferably has an optical property having light transmittance of 90% or more in order to ensure diffracted light passes through the cured liquid polymeric precursor.

The liquid polymeric precursor 31 includes a main monomer, a binder, and a photo-initiator.

The main monomer constitutes of about 50 to about 70% of the liquid polymeric precursor 41, and is can include hydroxypropyl acrylate (HPA), pentaerythritol triacrylate (PETIA), or ethyleneglycol dimethacrylate (EGDMA).

The binder constitutes about 50 to about 80% in the liquid polymeric precursor 31, and can include an acrylic monomer.

The binder is preferably applied in the form of a co-monomer in order to increase thermal flow. With this construction, the binder is conducive to secondary solidification via induction of thermal flow upon hard baking in a subsequent process. For example, the binder can be styrene-acryl co-monomer.

The binder has a hardness of 4 H to 5 H after being cured, and has a light transmittance of about 95% or more.

The photo-initiator has a content of approximately 3% or less in the liquid polymeric precursor 31, and includes a negative PR initiator. For example, the negative PR initiator can be IG-369 or TPA.

Figure 3C:
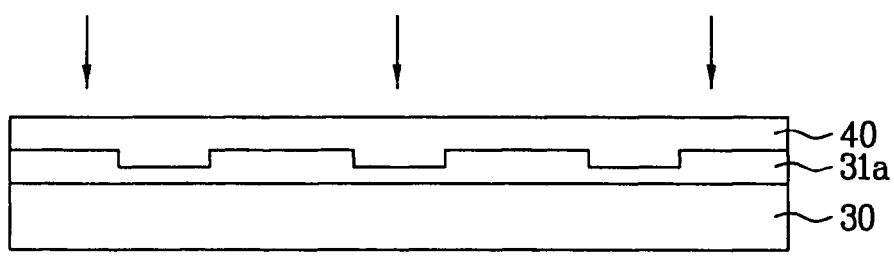

Next, as shown in FIG. 3C, the soft mold 40 is brought into contact with the liquid polymeric precursor 31.

Here, the protrusions of the soft mold 40 and the liquid polymeric precursor 31 are sucked into and filled in the grooves of the soft mold 40 via a capillary phenomenon.

As a result, the liquid polymeric precursor 31 has an embossed pattern of protrusions and grooves. The grooves of the liquid polymeric precursor have a predetermined thickness, which is determined when forming the protrusions of the soft mold 40.

Subsequently, the liquid polymeric precursor 31 is cured by performing a UV curing process or a thermal curing process. As a result, a cured polarization layer 31a is formed.

In the UV curing process, UV rays are irradiated in a wavelength range of about 300 nm to about 400 nm with a power of about 8 mW/cm$^2$ for about 10 to about 50 seconds.

Figure 3D:
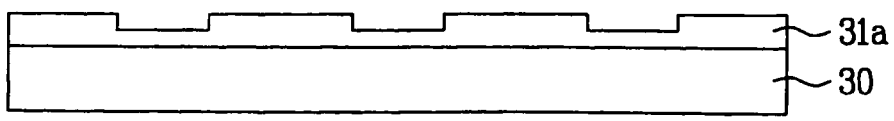

Finally, as shown in FIG. 3D, the soft mold 40 is stripped off the cured polarization layer 31a, forming a polarization layer which is attached to the upper surface of the light guide plate 30, and has the embossed pattern of protrusions and grooves formed on an upper surface thereof.

Alternatively, the polarization layer can be formed on a surface emission lamp instead of the light guide plate 30.

As apparent from the above description, according to the present invention, the backlight unit, the method for manufacturing the same, and the LCD device including the same have an advantageous effect as follows.

Since the polarization layer is directly formed on the upper surface of the backlight unit, it is unnecessary to provide an additional step of attaching a lower polarization plate to a lower surface of the liquid crystal panel, thereby simplifying the manufacturing process while enhancing conformity in the process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A backlight unit comprising:
a light guide plate;
at least one lamp provided at one or both sides of the light guide plate;
a lamp reflection plate positioned under the light guide plate to reflect light emitted from the lamp towards the light guide plate;
a polarization layer disposed directly on an upper surface of the light guide plate in order to polarize light irradiated from the light guide plate, and having an embossed pattern of protrusions and grooves formed on an upper surface thereof, wherein each of the protrusions and grooves has a rectangular shape, wherein a lower surface of the polarization is in contact with the upper surface of the light guide plate, and wherein two of the protrusions are positioned at opposite ends of the polarization layer; and
a light scattering assembly disposed directly on the polarization layer with a plurality of discrete gaps formed between the polarization layer and the light scattering assembly, the light scattering assembly having a plurality of diffusion sheets;
wherein the polarization layer is made of a liquid polymeric precursor comprising a material having a light transmittance of at least about 90%;

wherein the liquid polymeric precursor comprises a main monomer, a binder, and a photo-initiator;

wherein the main monomer constitutes about 50% to 70% of the liquid polymeric precursor and comprises hydroxypropyl acrylate (HPA);

wherein the binder comprises a material having a hardness of about 4 H to about 5 H after being cured, and has a light transmittance of at least about 95%;

wherein the binder is styrene-acryl co-monomer;

wherein the photo-initiator constitutes approximately about 3% or less in the liquid polymeric precursor.

2. The backlight unit according to claim 1 further comprising a lamp housing surrounding the lamp.

3. A liquid crystal display device comprising:

a liquid crystal panel having a polarization plate only on an upper surface of the liquid crystal panel; and a backlight unit positioned below the liquid crystal panel, the backlight unit having a light guide plate and a polarization layer disposed directly on an upper surface of the light guide plate in order to polarize light irradiated from the light guide plate, wherein the polarization layer have an embossed pattern of protrusions and grooves thereof, each of the protrusions and grooves has a rectangular shape, wherein a lower surface of the polarization is in contact with the upper surface of the light guide plate, and wherein two of the protrusions are positioned at opposite ends of the polarization layer;

wherein the backlight unit comprises a light scattering assembly disposed directly on the polarization layer with a plurality of discrete gaps formed between the polarization layer and the light scattering assembly, the light scattering assembly having a plurality of diffusion sheets;

wherein the polarization layer is made of a liquid polymeric precursor comprising a material having a light transmittance of at least about 90%;

wherein the liquid polymeric precursor comprises a main monomer, a binder, and a photo-initiator;

wherein the main monomer constitutes about 50% to 70% of the liquid polymeric precursor and comprises hydroxypropyl acrylate (HPA);

wherein the binder comprises a material having a hardness of about 4 H to about 5 H after being cured, and has a light transmittance of at least about 95%;

wherein the binder is styrene-acryl co-monomer;

wherein the photo-initiator constitutes approximately about 3% or less in the liquid polymeric precursor.

4. The liquid crystal display device according to claim 3, wherein the backlight unit comprises at least one lamp provided at one or both sides of the light guide plate, a lamp housing surrounding the lamp, a lamp reflection plate positioned under the light guide plate to reflect light emitted from the lamp towards the light guide plate, and a polarization layer attached to an upper surface of the light guide plate.

5. The liquid crystal display device according to claim 4, wherein the at least one lamp comprises one of a single unidirectional fluorescent lamp or a lamp assembly having multiple R, G and B light emitting diodes sequentially arranged in one direction.

* * * * *

UNITED STATES PATENT AND TRADEMARK OFFICE
CERTIFICATE OF CORRECTION

PATENT NO.        : 8,419,200 B2
APPLICATION NO.   : 11/472635
DATED             : April 16, 2013
INVENTOR(S)       : Chae et al.

It is certified that error appears in the above-identified patent and that said Letters Patent is hereby corrected as shown below:

On the Title Page

Item [75], replace "Wuk Kimq," with --Wuk Kim,--.

Signed and Sealed this
Twenty-second Day of April, 2014

Michelle K. Lee
*Deputy Director of the United States Patent and Trademark Office*